United States Patent [19]

Wiese et al.

[11] Patent Number: 4,889,206

[45] Date of Patent: Dec. 26, 1989

[54] VISCOUS SHEAR COUPLING

[75] Inventors: Helmut Wiese, Neunkirchen-Seelscheid; Paul-Erich Schönenbrücher, Much-Kränüchel, both of Fed. Rep. of Germany

[73] Assignee: Viscodrive GmbH, Lohmar, Fed. Rep. of Germany

[21] Appl. No.: 227,830

[22] Filed: Aug. 3, 1988

[30] Foreign Application Priority Data

Aug. 11, 1987 [DE] Fed. Rep. of Germany ....... 3726641

[51] Int. Cl.[4] ..................... B60K 17/34; F16D 35/00
[52] U.S. Cl. ................................. 180/248; 192/58 C
[58] Field of Search ............... 180/248, 247, 249, 250; 192/41 R, 58 B, 58 C

[56] References Cited

U.S. PATENT DOCUMENTS 4,562,897 1/1986 Renneker ........................... 180/233
4,683,998 8/1987 Cigdem et al. ................... 192/58 C
4,723,624 2/1988 Kawasaki et al. ................. 180/233

FOREIGN PATENT DOCUMENTS 3604771 8/1987 Fed. Rep. of Germany .

Primary Examiner—Charles A. Marmor
Assistant Examiner—Donn McGiehan
Attorney, Agent, or Firm—Toren, McGeady & Associates

[57] ABSTRACT

A viscous shear coupling has housing and hub parts (20 and 22) with interleaved sets of plates (35, 36, 37), the set of plates carried by the housing part being in two sub-sets (35 and 36), the plates (36) of one sub-set being rotationally fast with the housing part and the plates (35) of the other sub-set being capable of limited relative rotation to the housing part and the plates of the other sub-set; plates of the first set carry projections (50, 52) so that upon said relative rotation the spacing of the plates is varied thus to control the torque transmitted by the coupling.

19 Claims, 7 Drawing Sheets

4,889,206

VISCOUS SHEAR COUPLING

BACKGROUND OF THE INVENTION

1. Field of the Invention

This invention relates to viscous shear couplings. Viscous shear couplings in accordance with the invention have particular, but not exclusive, application in the drive transmissions of motor vehicles. The invention is also concerned with four-wheel drive vehicles including such viscous shear couplings.

2. Description of Prior Art

An example of a viscous shear coupling, which is described in GB-PS No. 1357106 (and in the corresponding U.S. Pat. No. 3,760,922 issued Sept. 25th, 1973), comprises a housing part; a hub part within the housing part, the parts being relatively rotatable about a common axis; a viscous liquid in the housing part; and first and second sets of annular plates in the housing part, the plates of the first set being rotationally fast with the housing part and being interleaved with the plates of the second set which are rotationally fast with the hub part.

Another example of a viscous coupling is shown in European No. PS-0068309 (and in the corresponding U.S. Pat. No. 4,721,010 issued Jan. 26th, 1988). In this coupling there is a housing part and first and second hub parts within the housing part, all the parts being relatively rotatable about a common axis. There are first, second and third sets of annular plates in the housing part, the plates of the first set being rotatable with the housing part and being interleaved with the plates of the second and third sets which are rotatable with the first and second hub parts respectively. There is a viscous liquid in the housing part.

Torque is transmitted between the housing part and the hub part(s) of the coupling due to shearing forces in the viscous liquid caused by relative rotation between adjacent plates. Viscous shear couplings are used, inter alia, in the drive transmissions of motor vehicles having four-wheel drive of the type known as a viscous transmission. In such a transmission there is a permanently driven axle and a viscous shear coupling is disposed in the drive to the wheels of a second axle thereof. For example, the vehicle may have a forwardly mounted engine, gearbox, and conventional drive arrangement to the vehicle front wheels, with an additional power output from the gearbox leading to a longitudinal drive line and the rear axle of the vehicle, the viscous shear coupling being disposed in such longitudinal drive line. As long as the wheels of the permanently driven front axle, due to a sufficiently high adhesion between tires and road surface, drive the vehicle with no or substantially no slip, there is practically no speed difference between the two parts of the viscous shear coupling, so that no torque is transmitted to the rear wheels. However, if one of the permanently driven front wheels spins due to lack of adhesion between tire and road surface, a speed difference occurs across the viscous shear coupling so that there is relative rotation between the parts thereof and torque is transmitted to the rear wheels through the coupling. The rear wheels then participate in driving the vehicle.

In another example of a viscous transmission a viscous shear coupling as described in European No. PS-0068309 is used in the rear axle and serves both as a drive unit and as a rear-axle inter-wheel differential gear.

With such a viscous transmission, problems can occur under braking. If the vehicle is braked sharply or on a slippery surface so that the front wheels of the vehicle are locked, the action of the viscous shear coupling will be such as to attempt also to lock the rear wheels and this is undesirable since, if the rear wheels lock, lateral stability of the vehicle is impaired. Moreover, if an anti-lock braking system is fitted to the vehicle, operation of the viscous coupling could, when the front wheels tend to lock, obstruct the operation of the braking system.

It has been proposed to include a one-way clutch unit in a viscous transmission so that no torque is transmitted through the longitudinal drive line via the viscous shear coupling when the rear wheels overrun the front wheels (see for example U.S. Pat. No. 4,605,087 issued Aug. 12th, 1986). Clearly to provide such an additional clutch unit is expensive and adds weight and complexity to the vehicle.

SUMMARY OF THE INVENTION

It is an object of the present invention to provide a viscous shear coupling which, by its design, has different torque transmitting characteristics according to which way torque is being transmitted through the unit. In particular, it is an object to provide a viscous shear coupling which, when there is relative rotation between the parts in one sense, builds up a high torque for driving purposes whereas, when there is relative rotation between the parts in the opposite sense, no torque or very little torque is transmitted through the coupling.

According to the invention this object is achieved by a viscous shear coupling comprising a housing part; a hub part within the housing part and extending therefrom in sealed relation thereto, the parts being relatively rotatable about a common axis; a viscous liquid in the housing part; first and second sets of annular plates in the housing part, the plates of the first set being rotatable with the housing part and being interleaved with the plates of the second set which are rotatable with the hub part; the plates of both sets being independently and axially movable with respect to the part with which they are rotatable, characterised by the provision of means operable by a change in the sense of relative rotation of the said parts to vary the spacing between adjacent plates so that in one sense of relative rotation between the parts adjacent plates are closer together than when there is relative rotation between said parts in the opposite sense.

Thus with this arrangement in a viscous transmission, when drive is to be transmitted to the rear wheels, the viscous coupling is arranged to have the spacing between adjacent plates small so that there is a transfer of torque to the rear wheels. If, however, the front wheels are locked and the rear wheels tend to overrun the front wheels then the sense of relative rotation between the parts of the coupling changes and the plates are spaced apart thus to reduce the torque flow back from the rear wheels to the front wheels. This enables the rear wheels to continue to rotate when the front wheels are locked without a considerable build up of torque. This will prevent the vehicle being unstable and, if an anti-lock braking system is fitted, will not affect the operation of the system.

Preferably the means for changing the spacing between the plates is formed by projections on some of the plates and by allowing some of the plates of one of the sets to be capable of limited relative rotation with respect to the part with which they rotate. The projections are preferably on each side of the plates.

The one set of plates may comprise two sub-sets with the plates of one sub-set being interposed between adjacent plates of the other sub-set and being capable of limited relative rotation with respect to the part which carries the one set and the plates of the other sub-set, the latter being held against relative rotation relative to said part, each plate of one sub-set carrying projections, the projections on adjacent plates of the one set being in mutual engagement during said relative rotation in said one sense and being spaced apart by the interposed plates of the other sub-set during said relative rotation in said other sense.

In this arrangement the plates of the one set may be splined to the part with which they are rotatable and provided with teeth which engage the splines, the projections being formed on the teeth of the plates of one of the sub-sets.

In another embodiment of the invention one set of plates comprises two sub-sets, the plates of one sub-set being interposed between adjacent plates of the other sub-set and being capable of limited relative rotation with respect to the part which carries the one set and the plates of the other sub-set, the latter being held against rotation relative to said part, each plate of the one set carrying projections, the projections of adjacent plates of the one set being out of mutual engagement when said relative rotation is in said one sense and being in mutual engagement when said relative rotation is in the opposite sense.

It is preferred that the set of plates having the two sub-sets are carried by the housing part but they could, equally, be carried by the hub part.

The minimum spacing between the plates of the one set may be determined by the projections on the plates or by spacer rings or other means if it is desired to have a spacing greater than that which can be obtained by use of the projections.

The invention also includes a motor vehicle including a prime mover and a drive transmission having front and rear pairs of drivable wheels wherein, when the vehicle is being driven, the wheels of the front pair are driven directly and permanently from the prime mover by an inter-wheel differential gear and the wheels of the rear pair are connected to the prime mover via one or more viscous shear couplings embodying the invention, the viscous shear coupling or couplings being arranged so that if one or both of the rear wheels overrun both of the front wheels, said parts of the viscous shear coupling or couplings connected to the overrunning wheel or wheels are rotating relative to one another in said opposite sense thus to space apart the plates in the or each coupling to reduce the torque transmitted by the coupling.

BRIEF DESCRIPTION OF DRAWINGS

The invention will now be described in detail by way of example with reference to the accompanying drawings in which.

DESCRIPTION OF PREFERRED EMBODIMENTS

Figure 1:
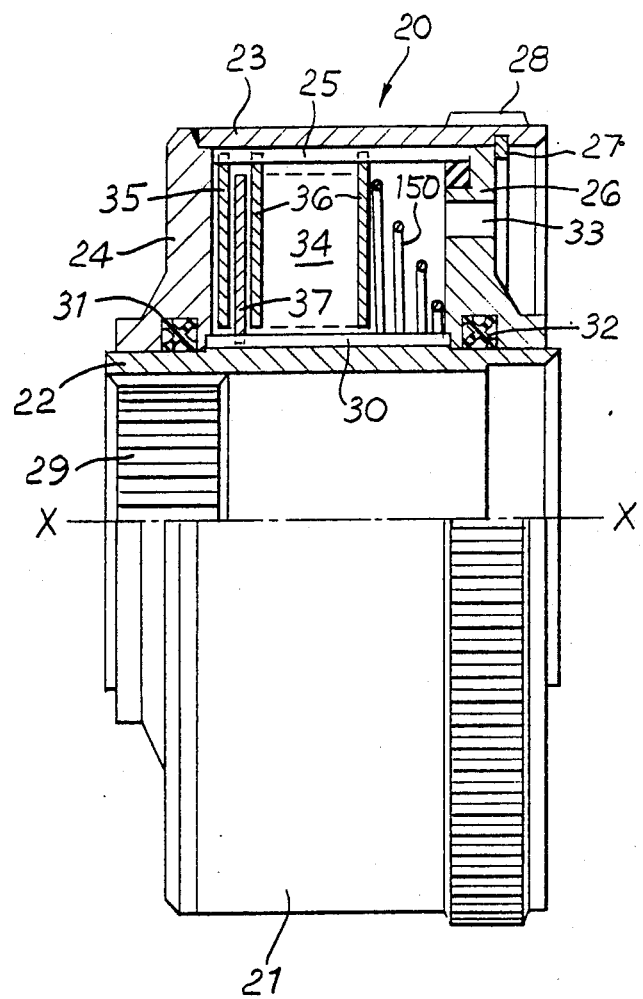
FIG. 1 is a partial cross section through a viscous coupling embodying the invention.

Referring now to FIGS. 1 to 5, the viscous coupling is indicated generally at 20 in FIG. 1 and comprises a housing part 21 and a hub part 22. The parts may rotate relative to one another about a common axis X—X.

The housing part 21 comprises a cylindrical barrel 23 which, at its left hand end, has welded thereto an end plate 24. The barrel is provided with internal splines 25 and at its right hand end is closed by an end plate 26 held in position by a circlip 27. The right hand end of the housing 21 is provided with teeth 28 for engaging means whereby the housing can be rotated.

The hub part 22 is cylindrical and is provided with internal splines 29, to receive a driving shaft, not shown, and external splines 30. The housing part and the hub part are mutually sealed by running seals 31 and 32 received in grooves in the end plates 24 and 26 respectively. The viscous coupling contains viscous fluid which is filled into the coupling via a filler 33. The viscous fluid may be a silicone oil.

The cavity 34 formed between the housing part and the hub part contains a plurality of annular plates which engage the splines 25 and 30 as will now be described.

Figure 2:
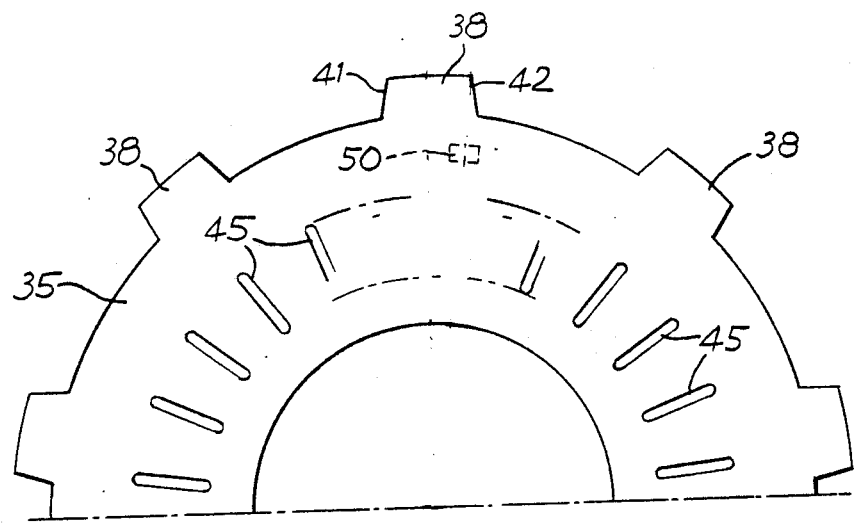
FIG. 2 is a half elevation of one type of outer plate included in the coupling.
Figure 3:
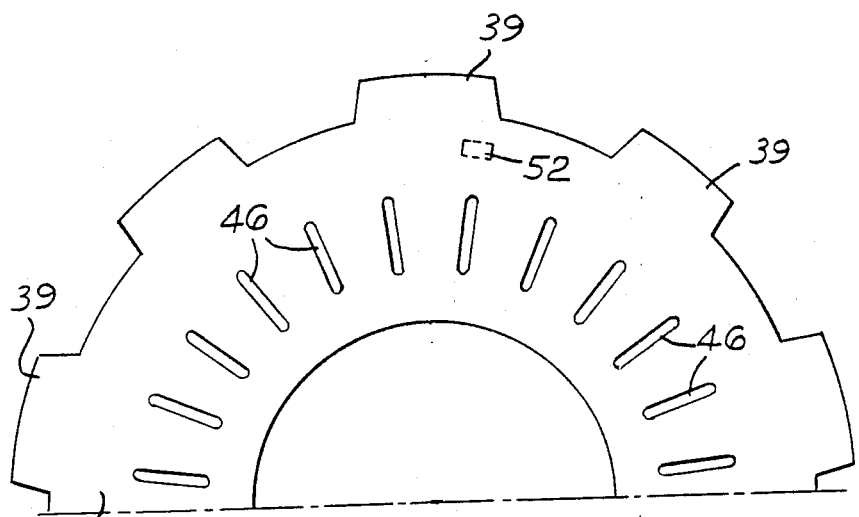
FIG. 3 is an elevation similar to FIG. 2 of the second type of outer plate used in the coupling.
Figure 4:
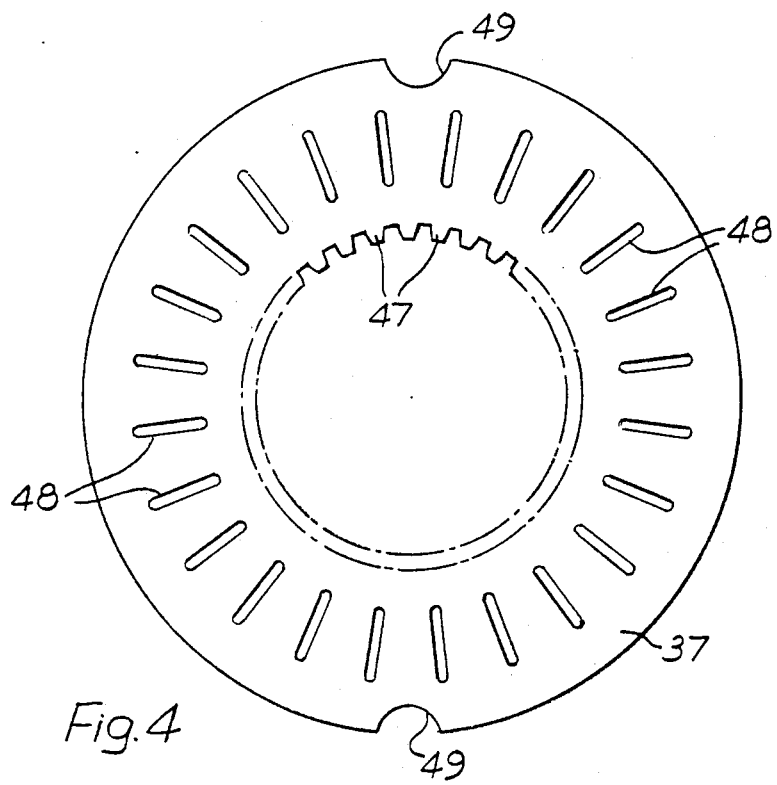
FIG. 4 is an elevation of an inner plate used in the coupling.

The internal splines 25 of a housing part are engaged by a first set of annular plates and these plates are divided into two sub-sets. FIG. 2 shows a plate 35 of one sub-set and FIG. 3 shows a plate 36 of the second sub-set. The hub part carries inner plates and one of these is shown in FIG. 4 at 37.

The outer plates are interleaved with the inner plates as shown in FIG. 1 which shows a plate 37 interposed between plates 35 and 36. The remaining plates are not shown in FIG. 1 but the arrangement is repeated with a plate 37 between each two plates 35 and 36 so that the plates 35, 36 of the first set are interleaved with the plates 37 of the second set.

Figure 5:
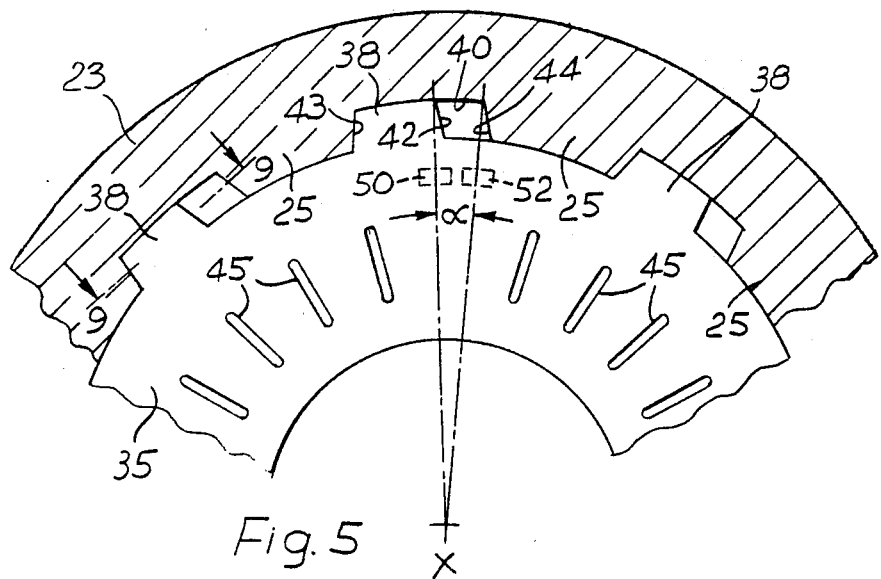
FIG. 5 is a partial cross sectional view of the coupling showing how the plates of FIGS. 2 and 3 are splined to the housing part.

The plate 35 in FIG. 2 has external teeth 38 to engage in the splines 25. The plate 36 has external teeth 39 also to engage in the splines 25. It will be noted that the teeth 39 have a greater circumferential extent than the teeth 38 and as shown in FIG. 5 by way of example, one of the channels 40 of the splines 25 is shown and the channel is of such size as closely to fit the teeth 39. The channel is wider than the teeth 38 so that the plates 35 are capable of limited rotational movement relative to the barrel 23 whereas the plates 36 cannot rotate relative to the barrel 23.

Thus referring to FIGS. 2 and 5, if a tooth 38 is considered to have two edges 41 and 42 and the channel 40 to have opposed walls 43 and 44, in the position shown in FIG. 5 the edge 41 of the tooth 38 will be in engagement with the wall 43. However, the plate 35 may rotate in a clockwise direction through an angle alpha until the edge 42 engages the wall 44 of the spline channel 40. It will be seen, therefore, that the plates 35 have a limited capability of angular rotation relative to the barrel 23 through an angle alpha and when they move they also move relative to the plates 36.

The plates 35 are provided with radial slots 45 and the plates 36 with slots 46 for the purposes set out in the aforementioned GBPS No. 1357106.

Referring to FIG. 4, the inner plates have teeth, some of which are shown at 47 which engage the external splines 30 on the hub part 11 so that the plates 37 are fast rotationally with the hub. The plates are provided with radial slots 48. At diametrically opposed positions the outer periphery of each plate 37 is relieved by a semicircular recess 49 which may be used for assembly purposes.

All the plates 35, 36 and 37 are slidable axially on their respective splines and are urged together by means of a conical spring 150 in the housing as shown in FIG. 1 which urges all the plates to the left in that figure. The spring thus urges the plates together to positions in which maximum torque may be transmitted through the coupling between the housing part and the hub part. However the spring is not essential since the pumping effect of the viscous liquid in the coupling will, when the coupling is in operation, tend to move the plates together.

The plates are provided with projections as will be described and these projections are used to vary the spacing between the plates consequent upon the relative rotation between the plates 35 and the barrel 23.

Figure 6:
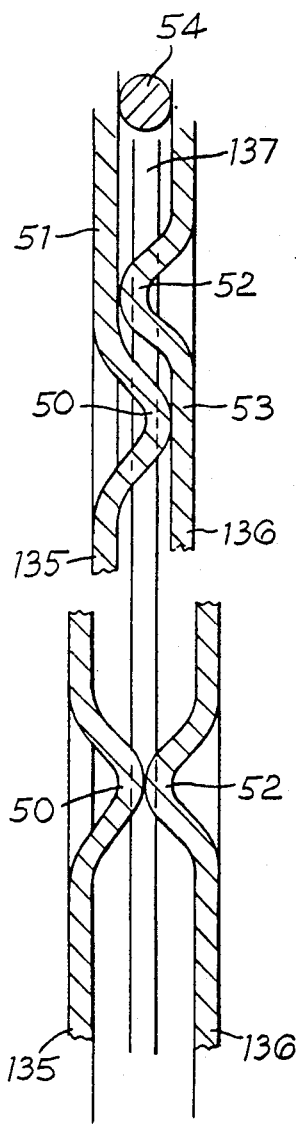
FIG. 6 is a diagrammatic view of three adjacent plates in the coupling showing how the spacing is varied.

Thus a first arrangement is shown in FIG. 6, the upper part of which shows the plates at a close spacing and the lower part of which shows the plates at a wider spacing.

In the following description of various embodiments plates such as 35 are indicated at 135, 235 etc. plates such as 36 are indicated at 136, 236 etc. and plates such as 37 are indicated at 137, 237 etc.

Referring to FIG. 6 this shows three plates of the coupling. Thus there is an outer plate 136 which is similar to the plate 36 and has teeth such that it cannot rotate relative to the housing part to which it is splined. There is an outer plate 135 which has teeth similar to that of the plate 35 in FIG. 2 and which is able to move through an angle alpha with respect to the housing part. Between them is a plate 137 which is splined to the hub part 30. The plate 135 has a projection 50 extending to the right from the planar part 51 thereof and the plate 136 has a projection 52 extending to the left from the planar part 53 thereof. In the position shown in the upper part of FIG. 6 the projection 50 on the plate 135 engages the planar part 53 of the plate 136 and the projection 52 on the plate 136 engages the planar part 51 on the plate 135. The minimum spacing between the plates 135 and 136 therefore may be set by engagement of the projections on the planar parts as above described. However in place of such an arrangement there may be a spacer ring 54 between each adjacent pair of plates such as 135 or 136 to set the minimum distance between them if it should be desired to have a minimum spacing greater than that provided by the projections.

The lower part of FIG. 6 shows the projections 50 and 52 in engagement and thus the spacing between the plates 135 and 136 has increased and the spacing between each of the plates 135 and 136 and the inner plate 137 has also increased. This is effected by the movement of the plate 135 relative to the barrel 23 and thus relative to the plate 136 to bring the projections 52 and 53 into engagement.

Thus assuming that normal drive is from the housing part to the hub part and assuming in FIG. 5 that the direction drive is in the direction of the arrow N, the walls 43 of the spline channels 40 will engage the edges 41 of the teeth 38. The inner plates 37 will tend to lag in the direction opposite to that of the arrow N if drive is from the housing part to the hub part.

If, however, the hub part begins to rotate faster than the housing part in the direction of the arrow N then the viscous shear forces between the inner plates 37 and plates 35 will have the effect of rotating the plates 35 through the angle alpha shown in FIG. 5 until the edges 42 of the teeth 38 engage the walls 44 of the spline channels and this movement brings the projections 50 and 52 into engagement. The projections are shown diagrammatically in FIG. 5 and as will be seen from FIG. 5 movement of the plate 35 clockwise through the angle alpha will bring the projection 50 on that plate into engagement with the projection 52 of the plate behind it shown for example in the lower part of FIG. 6 for the plates 135 and 136.

It is apparent that the projections 50 and 52 must be clear of the operative parts of the inner plates 37, 137 and they may be outside the diameter of the plates 37. Alternatively, the plates on the hub part may be provided with the projections which will be located inside the inner diameter of the outer plates.

There may be three projections such as 50 and 52 on each of the plates 135 and 136 and these can be equiangularly spaced round the plate. If it is required that each pair of adjacent plates 135, 136 move relative to one another to vary their spacing then on the plate 135 there will be three projections similar to the projection 50 but to the left and the plate 136 will have three projections similar to the projections 52 but to the right and equiangularly spaced round the plate. These projections will cooperate with projections on the plates such as 135 and 136 on either side of the pair shown in FIG. 6. However, only some of the adjacent pairs of plates 135, 136 may have projections to vary their spacings.

Figure 7:
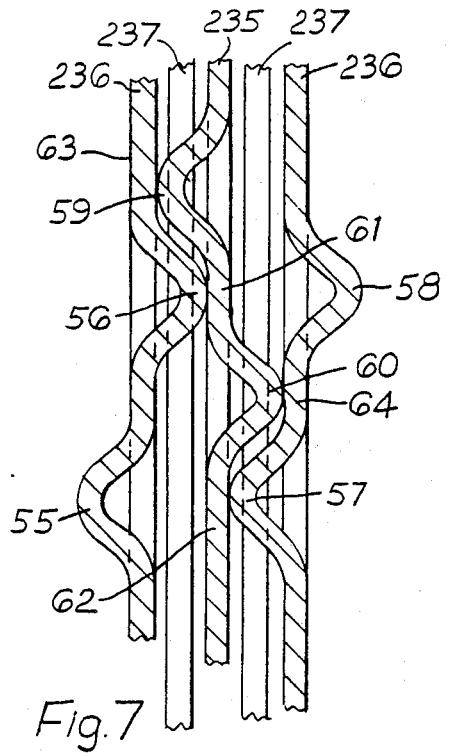
FIG. 7 is a view similar to FIG. 2 of another arrangement showing the plates at their close spacing.
Figure 8:
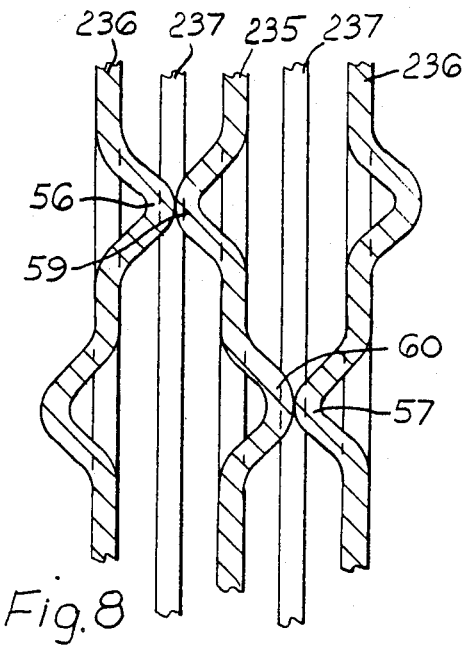
FIG. 8 is a view similar to FIG. 7 showing the plates at their wider spacing.

FIGS. 7 and 8 show a different arrangement. In these figures are shown five adjacent plates, one plate 235 similar in construction to the plate 35 and therefore capable of limited rotation relative to the barrel 23 and two plates 236 similar in construction to the plate 36 which are not capable of moving relative to the barrel. There are two inner plates 237 which are similar in construction to the plate 37 and are keyed to the hub part.

In FIG. 7 it will be seen that each of the plates 235 and 236 has projections on each side thereof. Thus in FIG. 7 the left hand plate 236 has a projection 55 extending to the left and a projection 56 extending to the right from its planar main portion. The right hand plate 236 has a projection 57 corresponding to the projection 55 and extending to the left and a projection 58 corresponding to the projection 56 extending to the right.

The plate 235 has a projection 59 extending to the left and a projection 60 extending to the right. In the arrangement shown in FIG. 7 the plates are close together and the minimum spacing is controlled by engagement of the various projections with the planar portions of the adjacent plates in the outer set. Thus the projection 56 on the left hand plate 236 engages the planar portion 61 on the plate 235 and the projection 57 also engages a planar portion 62 on that plate. The projection 59 on the plate 235 engages a planar portion 63 on the left hand plate 236 and the projection 60 on the plate 235 engages a planar portion 64 on the right hand plate 236. the position of the plates shown in FIG. 7 corresponds to the state shown in FIG. 5 with the barrel being driven in the direction of the arrow N.

If, now, the hub part begins to overrun the housing part then the teeth corresponding to the teeth 38 on the plate 235 will move across the splines and this will bring the projection 59 into engagement with the projection 56 and the projection 60 into engagement the projection 57. The plates will thus be spaced apart as shown in FIG. 8.

Should the housing part begin to drive the hub part again then the plates such as 35, 135 and 235 will tend to lag the housing part due to viscous shear forces between them and the inner plates on the hub until the plates again assume the position shown in FIG. 5 with the projections in the positions shown in the upper part of FIG. 6 or in FIG. 7.

There will be three sets of projections on each plate equiangularly spaced around the plate.

Figure 9:
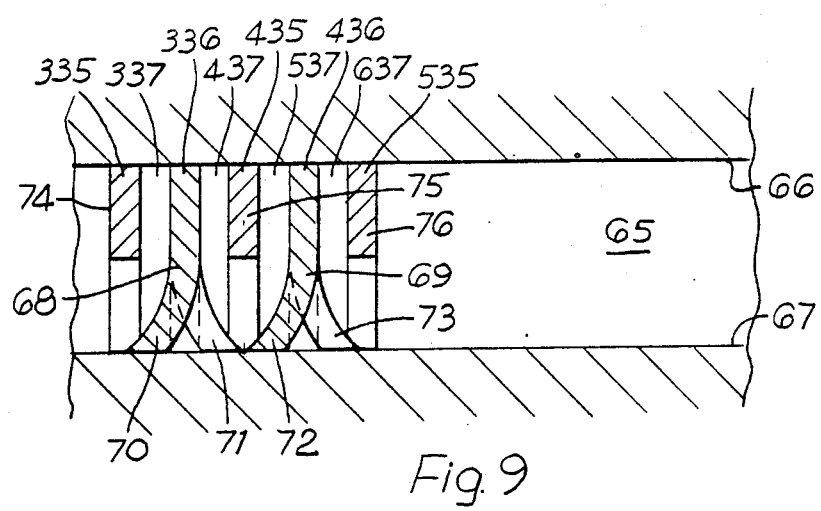
FIG. 9 is a view on the line 9—9 of FIG. 5 showing a further embodiment of the invention with the plates closely spaced together.
Figure 10:
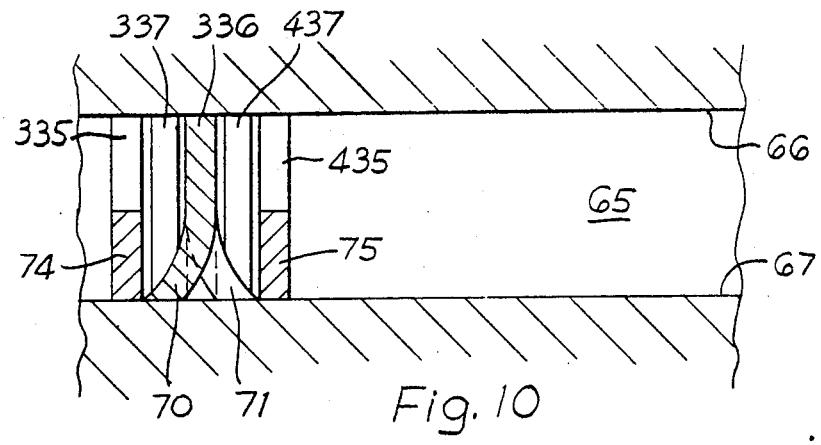
FIG. 10 is a view similar to FIG. 9 with the plates more widely spaced apart.

FIGS. 9 and 10 show a further arrangement in which the projections are formed on the teeth such as 39 of the plates similar to the plates 36. Thus referring to FIGS. 5, 9 and 10, the spline channel there shown is indicated at 65 having walls 66 and 67. FIG. 9 shows two plates 336 and 436 of constructions similar to the plate 36 in FIG. 3 and three plates 335, 435 and 535 similar to the plates 35. In between each pair of outer plates is an inner plate similar to the plate 37 and these are indicated at 337 to 637 respectively. Each of the plates 336 and 436 has a tooth 68 and 69 respectively which extends across the whole width of the spline channel 65 and engages the walls 66 and 67. Each tooth is bifurcated thus the tooth 68 has one bifurcation 70 extending to the left and another bifurcation 71 extending to the right. Similarly the tooth 69 has a bifurcation 72 extending to the left and a further bifurcation 73 extending to the right.

The teeth on the plates 335, 435 and 535 corresponding to the teeth 38 in FIG. 2 are indicated at 74, 75 and 76 respectively. FIG. 9 corresponds to the position shown in FIG. 5 where the trailing edge of each of the teeth 74, 75 and 76 is in engagement with the wall 66. This allows the bifurcations 71 and 72 to come into engagement and thus the plates to come to a close spacing which is limited by engagement of the bifurcations 71 and 72. The bifurcations 70 and 73 would engage with similar plates on either side. Alternatively spacer rings such as 54 may be provided to limit the minimum spacing.

If, however, the hub part starts to drive the housing part then the teeth 74, 75 and 76 will move in a manner described above until they engage the wall 67 of the spline channel 65 and this position is shown in FIG. 10. Thus as the tooth 74, for example, moves over it will engage the sloping flank of the bifurcation 70 and will thus cause the plate 335 to be spaced from the plate 336 and both from the plate 337. Similarly, as the tooth 75 moves over to engage the spline wall 67 it will engage the inclined flank of the bifurcation 70 and will thus cause the plate 435 to move away from the plate 336 and from the plate 437.

Figure 11:
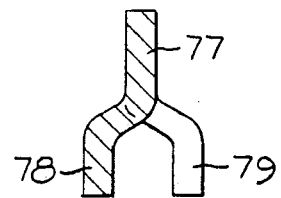
FIG. 11 is a detail view of a modification of the arrangement shown in FIGS. 9 and 10.

FIG. 11 shows a variation in the bifurcated tooth form for the plates such as 336 and 436, the tooth being indicated at 77 and having bifurcations 78 and 79.

Figure 12:
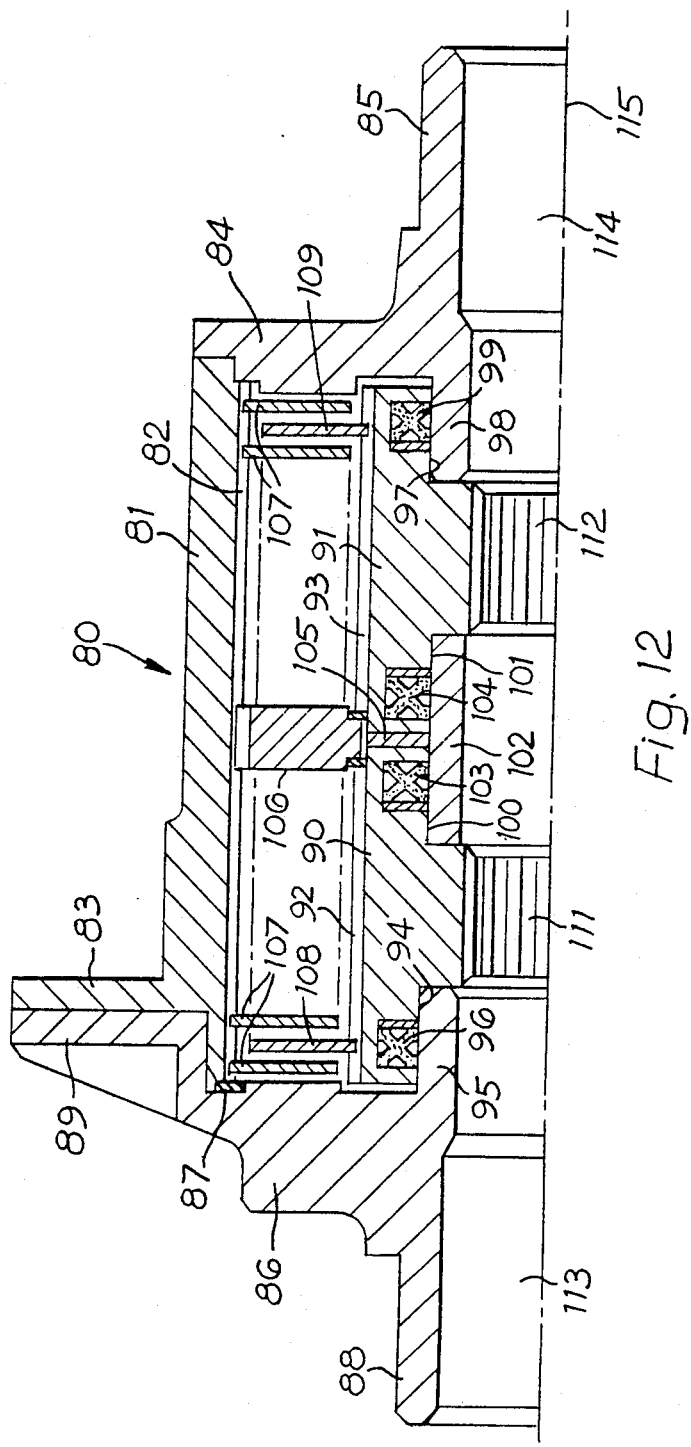
FIG. 12 is a half section through another form of viscous shear coupling embodying the invention.

FIG. 12 shows a viscous shear coupling which acts as a combined slip coupling and differential. The coupling comprises a housing part 80 which comprises a cylindrical wall 81 having internal splines 82 and an external flange 83. The cylindrical wall 81 is fixedly secured to an end member 84 having a hollow cylindrical extension 85. The other end of the housing is formed by a cover plate 86 which is sealed to the cylindrical wall at 87 and which has a hollow cylindrical extension 88 and a flange 89 aligned with the flange 83. The flange 83 may have bolted thereto a crown wheel, not shown, whereby the housing 80 may be driven, the crown wheel being driven by a pinion from a drive shaft (not shown).

With the housing part are two generally annular members 90 and 91 which are externally splined at 92 and 93 respectively. The member 90 is provided with a recess 94 in which is received a cylindrical flange 95 of the end member 86, the flange 95 and the member 90 being sealed by a seal 96. In a similar manner the member 91 has a recess 97 in which is received a cylindrical flange 98 of the end member 84, the member 91 of the flange 98 being sealed by a seal 99.

At their inner ends, the members 90 and 91 are provided respectively with recesses 100 and 101 within which is received a cylindrical member 102 which is sealed to the members 90 and 91 by seals 103 and 104. A thrust member 105 is located between the adjacent ends of the members 90 and 91 and a central diaphragm 106 divides the interior of the housing into two parts which are in communication with one another so that liquid can flow from one part to another.

There is a first set of plates, some of which are indicated at 107, splined to the splines 82 of the housing part so as to rotate therewith. There is a second set of plates, one of which is shown at 108 which is splined to the splines 92 of the member 90 so as to rotate therewith, the plates 108 being interleaved with the plates 107 which are to the left of the diaphragm 106. There is a third set of plates, one of which is shown at 109 which is splined to the splines 93 of the member 91. The plates 109 are interleaved with the plates 107 to the right of the diaphragm 106.

The first set of plates 107 consists of two sub-sets of plates as described above, the plates of one sub-set being similar to the plate 35 shown in FIG. 2 and being capable of limited relative rotation relative to the splines 82, the second sub-set being similar to the plate 36 shown in FIG. 3 and being incapable of relative rotation relative to the splines 82.

The projections on the plates 107 may be as described in any of the above described embodiments. The plates 107 and 109 are similar to the plates 37 shown in FIG. 4.

All the plates 107 or the plates 108 and 109 are independently axially movable on their supporting splines.

The members 90 and 91 are internally splined at 111 and 112 and receive shafts 113 and 114 respectively having external splines to mate with the splines 111 and 112. The member 90 forms a first hub part and the member 91 a second hub part. Each hub part extends from the housing in sealed relation thereto and the hub parts are rotatable relative to the housing about a common axis 115 and are also relatively rotatable with respect to each other about said axis.

The interior space in the housing part 80 not taken up by the plates contains a viscous liquid such as a silicone oil as described above. If desired a spring similar to the spring 150 described with reference to FIG. 1, may be provided on each side of the diaphragm 106 to urge the plates on that side of the diaphragm together.

When the housing part 80 drives the hub parts 90 and 91, the plates 107 in the first sub-set will be in the position shown for the plate 35 in FIG. 5 and the projections on the plates of the two sub-sets will be out of engagement and thus all the plates 107, 108 and 107, 109 will be close together to transmit torque. If now the hub part 90 starts to overrun the housing part 80, the plates 107 in the first sub-set to the left of the diaphragm 106 will rotate relative to the housing part 80 for the reasons described above and will bring the projections on the plates 107 to the left of the diaphragm 106 into contact thus spacing these plates apart and from the plates 108. Little or no torque will thus be transmitted from the hub part 90 to the housing part 80. A similar effect will happen if the hub part 91 or both the hub parts 90 and 91 tend to overrun the housing part 80.

Since the two hub parts 90 and 91 are independently rotatable the coupling acts as a differential as well as a slip coupling as described in detail in European No. PS-0068309 (and in corresponding U.S. Pat. No. 4,721,010 issued Jan. 26th, 1988).

Although in the foregoing description all the plates of the set splined to the housing part are arranged to carry projections to give variable spacing, it is within the invention to provide projections on only some of the adjacent pairs of plates of that set.

Figure 13:
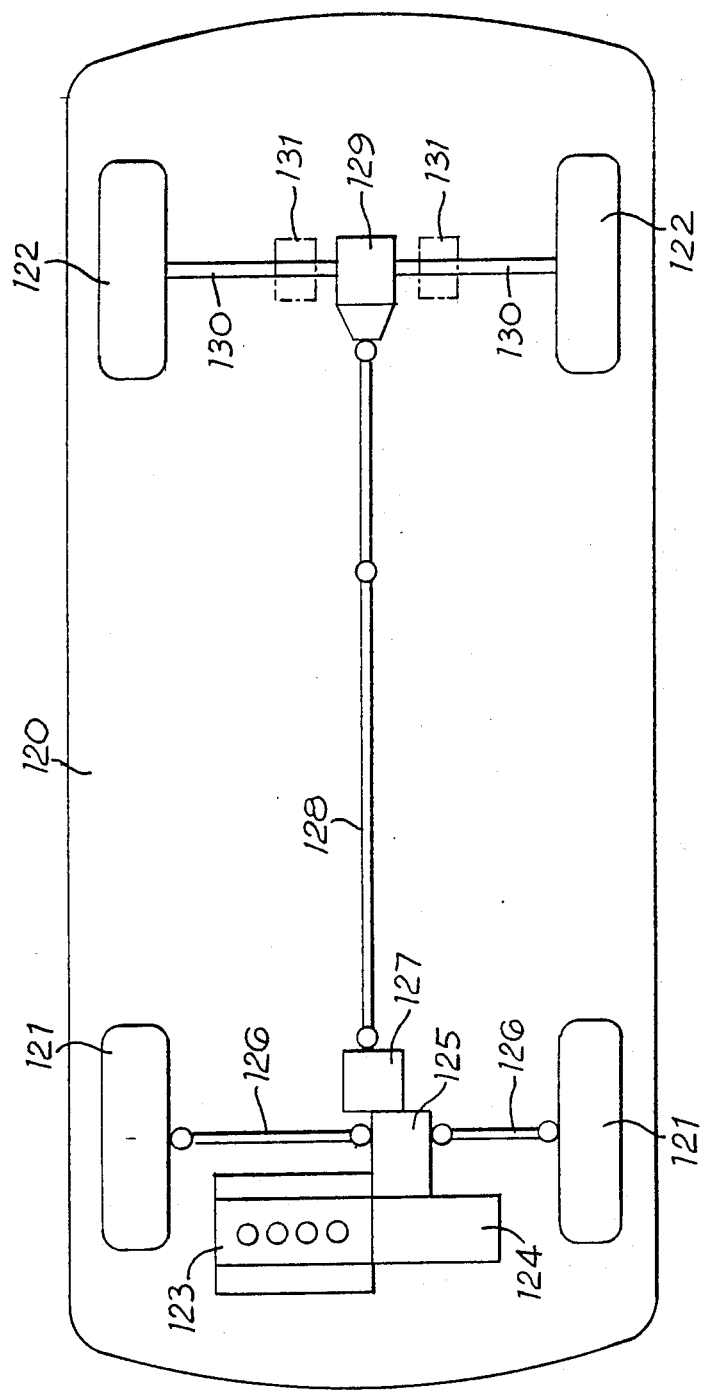
FIG. 13 is a diagrammatic view of a motor vehicle including a viscous coupling embodying the invention.

FIG. 13 illustrates the application of a viscous coupling embodying the invention and of the type shown in FIG. 1 to a motor vehicle.

Referring to this figure a motor vehicle is indicated at 120 having a pair of front wheels 121 and a pair of rear wheels 122. A prime mover 123 drives a gear box 124 which drives an inter wheel differential gear 125. The latter drives the front wheels 121 through drive shafts 126. A viscous shear coupling 127 as described with reference to FIGS. 1 to 10 is connected to an output from the gear box 125 and also drives a propeller shaft 128. Thus the housing part of the viscous shear coupling could be connected to the gear box and the hub part to the propeller shaft 128. The other end of the propeller shaft 128 drives a gear type inter wheel differential gear 129 which through drive shafts 130 drives the rear wheels 122.

Normally the vehicle is driven by the front wheels 121. Should however one or both of the front wheels begin to slip with respect to the rear wheels 122 there will be a speed difference across the viscous coupling 127 and the housing part will tend to drive the hub part. The plates in the viscous coupling will thus be at their closest spacing and drive will therefore be provided to the propeller shaft 128 and to the rear wheels 122.

However, should the front wheels 121 lock so that one or more of the rear wheels 122 tends to overrun the front wheels 121 then the relative sense of rotation between the parts of the viscous coupling 127 will reverse and the hub part will tend to drive the housing part. The plates which are then movable relative to the housing part will move due to the viscous shear drag as described above and the plates will be spaced apart so that a minimum torque will be transferred from the front wheels to the rear wheels. There will be no danger of the rear wheels locking with consequent instability of the vehicle or interference with any anti-lock braking system.

Instead of a single viscous coupling 127 two such couplings could be interposed in the drive shafts 130 as indicated in dotted lines at 131. In such case the differential 129 could be replaced merely by a crown wheel drive.

In a further arrangement a single viscous coupling such as described with reference to FIG. 12 could replace both the coupling 127 and the differential 129 being located in the rear axle between the shaft 128 and the shafts 130 with its housing part driven from the shaft 128 by a crown wheel pinion. As described the coupling will act both as a slip coupling and differential.

We claim:

1. A motor vehicle including a prime mover and a drive transmission having front and rear pairs of drivable wheels wherein, when the vehicle is being driven, the wheels of the front pair are driven directly and permanently from the prime mover via an inter-wheel differential gear and the wheels of the rear pair are connected to the prime mover via a viscous shear coupling comprising a housing part, first and second hub parts within the housing part, extending therefrom in sealed relation thereto and connected to the respective rear wheels, all said parts being relatively rotatable about a common axis; a viscous liquid in the housing part; first, second and third sets of annular plates in the housing part, the plates of the first set being rotatable with the housing part and being interleaved with the plates of the second and third sets which are rotatable with the first and second hub parts respectively; the plates of all the sets being independently and axially movable with respect to the part with which they are rotatable, means operable by a change in the sense of relative rotation of the first part and each of the second and third parts respectively to vary the spacing between adjacent plates carried by the relatively rotating plates so that in one sense of relative rotation between said parts adjacent plates are closer together than when there is relative rotation between said parts in the opposite sense; the viscous shear coupling being arranged so that if one or both of the rear wheels overrun both of the front wheels, said parts of the viscous shear coupling connected to the overrunning wheel or wheels are rotating relative to one another in said opposite sense thus to space apart plates in the coupling and to reduce the torque transmitted by the coupling.

2. A viscous shear coupling comprising:
a housing part;
a hub part within the housing part and extending therefrom in sealed relation thereto, the parts being relatively rotatable about a common axis;
a viscous liquid in the housing part;
first and second sets of annular plates in the housing part, the plates of the first set being rotatable with the housing part and being interleaved with the plates of the second set which are rotatable with the hub part, the plates of both sets being independently and axially movable with respect to the part with which they are rotatable, at least some of the plates of one set being capable of limited relative rotation with respect to the part with which they rotate; and projections on at least some of the plates, said projections are moved into and out of engagement with each other by said limited relative rotation of said plates caused by a change in the sense of relative rotation of said parts to vary the spacing between adjacent plates so that in one sense of relative rotation between the parts adjacent plates are closer together than when there is relative rotation between said parts in the opposite sense.

3. A coupling according to claim 2 wherein each plate having projections has projections on each side thereof.

4. A coupling according to claim 2 including spacer means which, during said relative rotation of said parts in said one sense limit the minimum spacing of adjacent plates of the one set.

5. A coupling according to claim 4 wherein the spacer means comprises spacers between adjacent plates of the one set.

6. A coupling according to claim 4 wherein the spacer means comprises projections on at least some of the plates of the one set engaging planar portions of others of the plates of that set.

7. A coupling according to claim 2 including spring means within the housing part urging all the plates of the coupling together.

8. A viscous shear coupling comprising a housing part, first and second hub parts within the housing part extending therefrom in sealed relation thereto, all said parts being relatively rotatable about a common axis; a viscous liquid in the housing part; first, second and third sets of annular plates in the housing, the plates of the first set being rotatable with the housing part and being interleaved with the plates of the second and third sets which are rotatable with the first and second hub parts respectively; the plates of all the sets being independently and axially movable with respect to the part with which they are rotatable, characterised by the provision of means operable by a change in the sense of relative rotation of the first part and each of the second and third parts respectively to vary the spacing between adjacent plates carried by the relatively rotating parts so that in one sense of relative rotation between said parts adjacent plates are closer together than when there is relative rotation between said parts in the opposite sense.

9. A coupling according to claim 8 wherein at least some of the plates of at least one set are capable of limited relative rotation with respect to the part with which they rotate and said means comprises projections on at least some of the plates.

10. A coupling according to claim 9 wherein each plate having projections has projections on each side thereof.

11. A coupling according to claim 8 including spring means within the housing part urging all the plates of the coupling together.

12. A viscous shear coupling comprising a housing part, a hub part within the housing part and extending therefrom in sealed relation thereto, the parts being relatively rotatable about a common axis; a viscous liquid in the housing part; first and second sets of annular plates in the housing part, the plates of the first set being rotatable with the housing part and being interleaved with the plates of the second set which are rotatable with the hub part; the plates of both sets being independently and axially movable with respect to the part with which they are rotatable; wherein one set of plates comprises two sub-sets with the plates of one sub-set being interposed between adjacent plates of the other sub-set and being capable of limited relative rotation with respect to the part which carries the one set and with respect to the plates of the other sub-set, the latter being held against relative rotation relative to said part, and means operable by a change in the sense of relative rotation of the said parts to vary the spacing between adjacent plates, said means comprising projections carried by at least some pairs of adjacent plates of one sub-set, the projections on adjacent plates of the one sub-set being in mutual engagement during relative rotation between said parts in one sense and being spaced apart by interposed plates of the other sub-set during relative rotation in the opposite sense.

13. A coupling according to claim 12 wherein the plates of the one set are splined to the part with which they are rotatable and are provided with teeth which engage the splines and wherein the projections are formed on the teeth of the plates of the one sub-set.

14. A coupling according to claim 12 wherein one set of plates in the first set is carried by the housing part.

15. A viscous shear coupling comprising a housing part, a hub part within the housing part and extending therefrom in sealed relation thereto, the parts being relatively rotatable about a common axis; a viscous liquid in the housing part; first and second sets of annular plates in the housing part, the plates of the first set being rotatable with the housing part and being interleaved with the plates of the second set which are rotatable with the hub part; the plates of both sets being independently and axially movable with respect to the part with which they are rotatable; wherein one set of plates comprises two sub-sets, the plates of one sub-set being interposed between adjacent plates of the other sub-set and being capable of limited relative rotation with respect to the part which carries the one set and with respect to the plates of the other sub-set, the latter being held against rotation relative to said part, and means operable by a change in the sense of relative rotation of the said parts to vary the spacing between adjacent plates, said means comprising projections carried by at least some adjacent pairs of plates of the one set, the projections on adjacent plates of the one set being out of mutual engagement when said relative rotation is in said one sense and being in mutual engagement when said relative rotation is in the opposite sense.

16. A coupling according to claim 15 wherein the one set of plates is the said first set and is carried by the housing part.

17. A motor vehicle including a prime mover and a drive transmission having front and rear pairs of drivable wheels, wherein, when the vehicle is being driven, the wheels of the front pair are driven directly and permanently from the prime mover via an inter-wheel differential gear and the wheels of the one rear pair are connected to the prime mover via at least one viscous shear coupling, the at least one viscous shear coupling comprising a housing part, a hub part within the housing part and extending therefrom in sealed relation thereto, the parts being relatively rotatable about a common axis, a viscous liquid in the housing part, first and second sets of annular plates in the housing part, the plates of the first set being rotatable with the housing part and being interleaved with the plates of the second set which are rotatable with the hub part, the plates of both sets being independently and axially movable with respect to the part with which they are rotatable, at least some of the plates being capable of limited relative rotation with respect to the part with which they rotate, and projections on at least some of the plates, said projections are moved into and out of engagement with each other by said limited relative rotation of said plates caused by a change in the sense of relative rotation of said parts to vary the spacing between the parts so that adjacent plates are closer together than when there is relative rotation between said parts in the opposite sense, the at lest one viscous shear coupling being arranged so that if at least one of the rear wheels overruns both of the front wheels, said parts of the at least one viscous shear coupling connected to the overrunning wheel rotate relative to one another in said opposite sense so as to space apart the plates in the at least one coupling to reduce the torque transmitted by the coupling.

18. A motor vehicle according to claim 17 wherein the wheels of the rear pair are connected to the respective outputs of a gear-type, interwheel differential gear and wherein the input of such differential gear is connected to the prime mover via a viscous shear coupling.

19. A motor vehicle according to claim 17 wherein each wheel of the rear pair is connected to the prime mover through a separate viscous shear coupling.

* * * * *